(12) United States Patent
Asafuku

(10) Patent No.: US 8,570,565 B2
(45) Date of Patent: Oct. 29, 2013

(54) PRINTING APPARATUS, METHOD, SYSTEM AND COMPUTER-READABLE STORAGE MEDIA USING A PRINTING ENVIRONMENT DETERMINATION PROGRAM

(75) Inventor: Minoru Asafuku, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 605 days.

(21) Appl. No.: 12/882,697

(22) Filed: Sep. 15, 2010

(65) Prior Publication Data

US 2011/0222110 A1    Sep. 15, 2011

(30) Foreign Application Priority Data

Mar. 10, 2010    (JP) .................................. 2010-053069

(51) Int. Cl.
    *G06F 3/12*    (2006.01)
(52) U.S. Cl.
    USPC ......... 358/1.15; 358/1.13; 358/1.14; 358/1.9; 358/403; 455/418; 455/419; 455/420; 455/556.1; 455/557; 382/305; 709/221; 709/222; 709/223; 715/200; 715/747
(58) Field of Classification Search
    None
    See application file for complete search history.

(56) References Cited

U.S. PATENT DOCUMENTS

| | | | |
|---|---|---|---|
| 6,040,920 A * | 3/2000 | Ichiriki | 358/403 |
| 6,505,252 B1 | 1/2003 | Nagasaka | |
| 6,519,049 B1 * | 2/2003 | Nagasaka | 358/1.15 |
| 6,763,501 B1 * | 7/2004 | Zhu et al. | 715/234 |
| 6,943,905 B2 * | 9/2005 | Ferlitsch | 358/1.13 |
| 7,444,646 B2 * | 10/2008 | Su et al. | 719/321 |
| 7,636,584 B2 * | 12/2009 | Anderson et al. | 455/556.2 |
| 7,788,349 B2 * | 8/2010 | Tada | 709/220 |
| 2006/0221370 A1 * | 10/2006 | Iida | 358/1.13 |

FOREIGN PATENT DOCUMENTS

| | | |
|---|---|---|
| JP | 2004-246916 A | 9/2004 |
| JP | 2006-134043 A | 5/2006 |
| JP | 2007-036987 A | 2/2007 |
| JP | 2008-152545 A | 7/2008 |

* cited by examiner

*Primary Examiner* — Paul F Payer
(74) *Attorney, Agent, or Firm* — Sughrue Mion, PLLC

(57) ABSTRACT

A printing system includes a terminal apparatus and a server apparatus. The terminal apparatus is connected to a printing apparatus through a local area network. The server apparatus communicates with the terminal apparatus through an external communication network on an outside of the local area network and executes an application in response to an operating signal received from the terminal apparatus. The terminal apparatus includes a specifying unit, a research unit, and a selecting unit. The specifying unit specifies a model of a printing apparatus connected to the terminal apparatus through the local area network by executing an environmental research program. The research unit determines whether a printing apparatus driver corresponding to the model specified by the specifying unit is present in either the terminal apparatus or the server apparatus. The selecting unit selects either a first method or a second method.

6 Claims, 8 Drawing Sheets

PRINTING APPARATUS, METHOD, SYSTEM AND COMPUTER-READABLE STORAGE MEDIA USING A PRINTING ENVIRONMENT DETERMINATION PROGRAM

CROSS-REFERENCE TO RELATED APPLICATIONS

This application is based upon and claims priority under 35 USC 119 from Japanese Patent Application No. 2010-053069, filed Mar. 10, 2010.

BACKGROUND

Technical Field

The present invention relates to a printing system, an environment research method, and a computer readable medium.

SUMMARY OF THE INVENTION

According to an aspect of the invention, a printing system includes a terminal apparatus and a server apparatus. The terminal apparatus is connected to a printing apparatus through a local area network. The server apparatus communicates with the terminal apparatus through an external communication network on an outside of the local area network and executes an application in response to an operating signal received from the terminal apparatus. The terminal apparatus includes a specifying unit, a research unit, and a selecting unit. The specifying unit specifies a model of a printing apparatus connected to the terminal apparatus through the local area network by executing an environmental research program. The research unit determines whether a printing apparatus driver corresponding to the model specified by the specifying unit is present in either the terminal apparatus or the server apparatus. The selecting unit selects either a first method for receiving a print instruction from an application executed by the server apparatus depending on a result of the research of the research unit, generating print information in accordance with the print instruction received in the printing apparatus driver of the terminal apparatus and transmitting the print information to the printing apparatus, or a second method for causing the printing apparatus driver in the server apparatus to generate print information in accordance with the print instruction of the application and transmitting the print information from the server apparatus to the printing apparatus.

BRIEF DESCRIPTION OF THE DRAWINGS

Exemplary embodiments of the invention will be described in detail based on the following figures, wherein.

DETAILED DESCRIPTION (Structure of Printing System)

Figure 1:
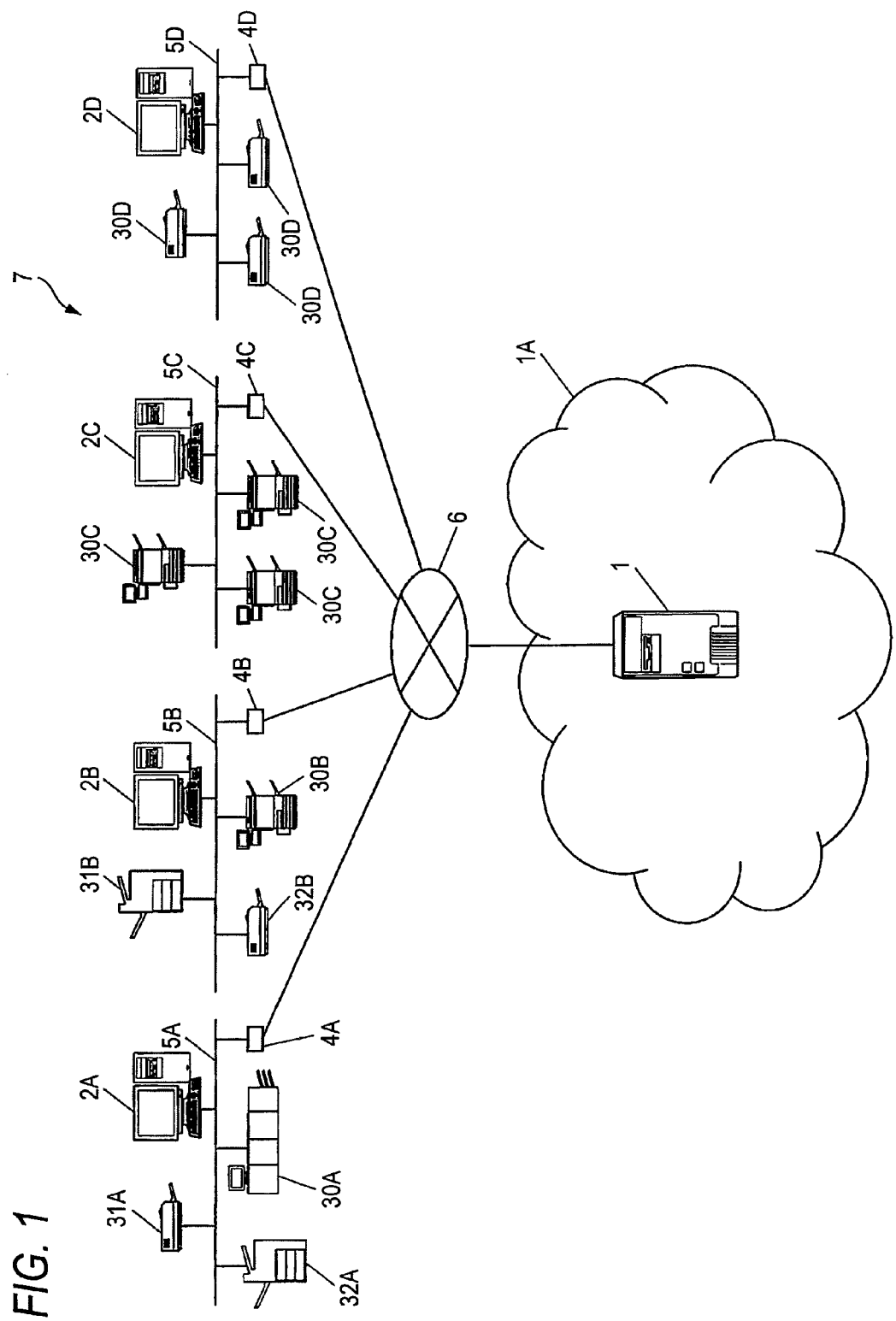
FIG. 1 is a schematic view showing an example of a structure of a printing system according to an exemplary embodiment of the invention.

FIG. 1 is a schematic view showing an example of a structure of a printing system according to an exemplary embodiment of the invention.

A printing system 7 has a structure in which a terminal apparatus 2A and printing apparatuses 30A to 32A are connected through a LAN (Local Area Network) 5A, and a server apparatus 1 is connected to the LAN 5A through a router 4A and an internet 6.

In the same manner as the terminal apparatus 2A, the printing apparatuses 30A to 32A, the router 4A and the LAN 5A, terminal apparatuses 2B to 2D, printing apparatuses 30B to 32B, printing apparatuses 30C and 30D, routers 4B to 4D and LANs 5B to 5D are also connected to the server apparatus 1 through the internet 6. Although each of the terminal apparatuses 2A to 2D is provided for each of the LANs 5A to 5D as shown in FIG. 1, a plurality of terminal apparatuses may be provided.

The server apparatus 1 is operated in a distribution executing environment 1A, and is generally operated through a distribution of a processing burden such as an application by using resources of a plurality of server apparatuses actually. For simplicity of description, however, explanation will be given to the simple server apparatus 1. The application is operated depending on contents of an operation which are input to the terminal apparatuses 2A to 2D.

The terminal apparatuses 2A to 2D are operated by a user, thereby giving the server apparatus 1 a request for executing the application of the server apparatus 1, and are schematically constituted to have a control portion formed by a CPU (Central Processing Unit), a storing portion for storing information, an operating portion 24 such as a keyboard or a mouse, and a displaying portion such as a liquid crystal display.

The printing apparatuses 30A to 32A and 30B to 32B serve to print print data received from the server apparatus 1. The printing apparatuses 30A to 32A are different models from each other and a printing apparatus driver for operating each of them is generally possessed by the terminal apparatus 2A. Similarly, the printing apparatuses 30B to 32B are different models from each other and a printing apparatus driver for operating each of them is possessed by the terminal apparatus 2B. Moreover, the printing apparatuses 30A to 32A and 30B to 32B have printing apparatus setting information indicative of information about a specification of a paper tray or a specification of a finisher which may be utilized, respectively.

The printing apparatus 30C serves to print print data received from the server apparatus 1. The printing apparatuses 30C connected to the LAN 5C are the same models and a printing apparatus driver for operating each of them is not possessed by the terminal apparatus 2C but the server apparatus 1. Similarly, the printing apparatuses 30D connected to the LAN 5D are the same models and a printing apparatus driver for operating each of them is possessed by the server apparatus 1. Moreover, the printing apparatuses 30C and 30D have the printing apparatus setting information indicative of the information about the specification of the paper tray or the specification of the finisher which may be utilized, respectively.

In the case in which the same printing apparatuses 30C and 30D are provided through the LANs 5C and 5D, generally, it is ideal that the printing apparatus drivers are present on the server apparatus 1 side and are managed in a lump through an execution of a work such as upgrade in the server apparatus 1. As a matter of fact, it is hard to manage a huge number of printing apparatus drivers in the server apparatus 1. For this reason, a plurality of different printing apparatuses is connected through the LANs 5A and 5B. In the case in which a printing apparatus to be a minority is included, a printing apparatus driver is installed on the terminal apparatus side.

(Structure of Server Apparatus)

Figure 2:
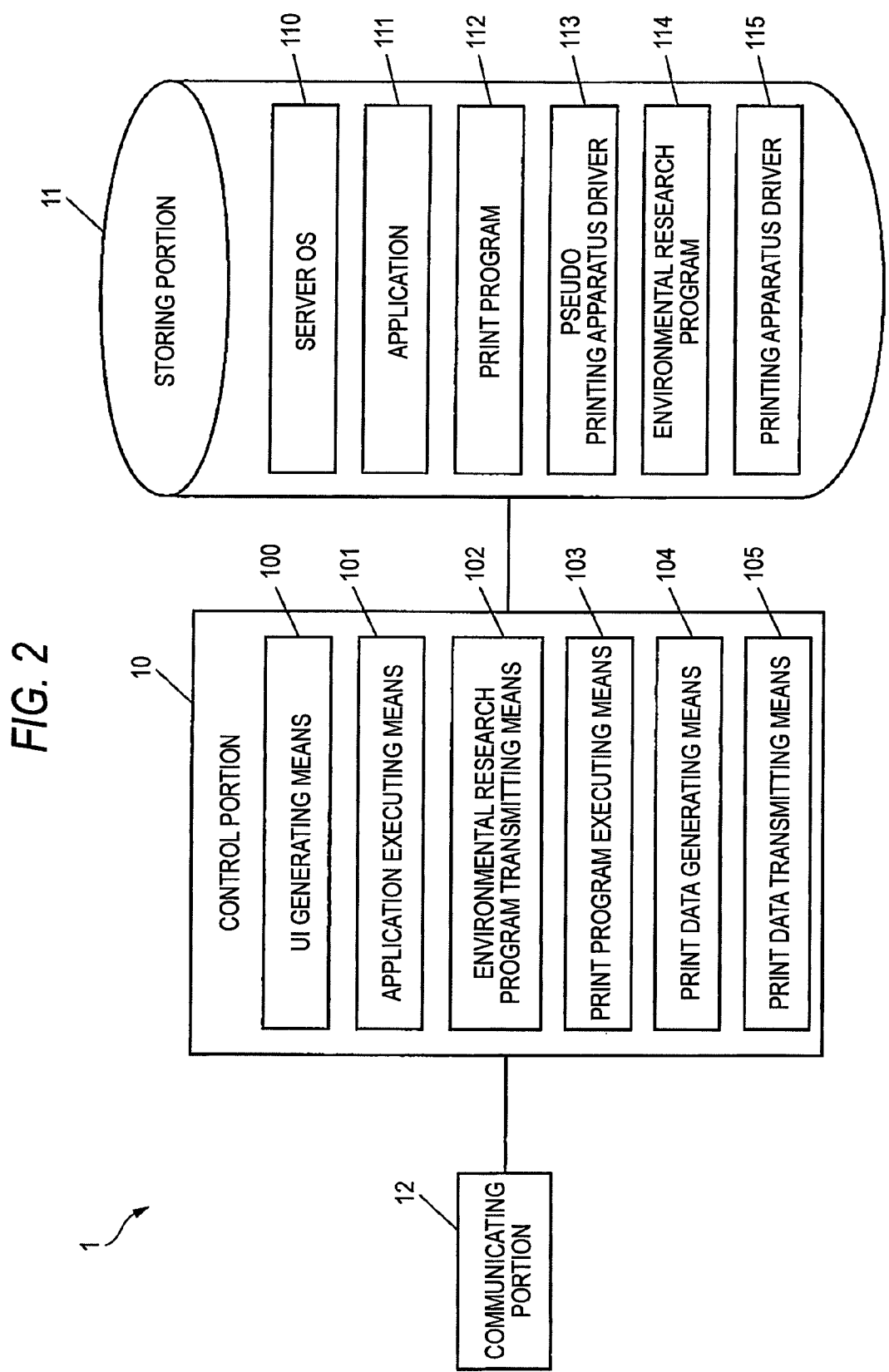
FIG. 2 is a schematic diagram showing an example of a structure of a server apparatus.

FIG. 2 is a schematic diagram showing an example of a structure of the server apparatus 1.

The server apparatus 1 has a control portion 10 constituted by a CPU and serving to control each portion of the server apparatus 1 and to execute various programs, a storing portion 11 constituted by a storing device such as an HDD (Hard Disk Drive) or a flash memory and serving to store various information, and a communicating portion 12 for communicating with an outside through the internet 6.

The control portion 10 executes a server OS 110 which will be described below, thereby functioning as user interface (hereinafter referred to as "UI") generating means 100, application executing means 101, environmental research program transmitting means 102, print program executing means 103, print data generating means 104 and print data transmitting means 105.

The UI generating means 100 generates image information for an operation which are to be displayed on the terminal apparatuses 2A to 2D depending on the contents of the operation which are received from the terminal apparatuses 2A to 2D.

The application executing means 101 is operated by executing an application 111 which will be described below depending on the contents of the operation which are received from the terminal apparatuses 2A to 2D.

The environmental research program transmitting means 102 transmits an environmental research program 114 to the terminal apparatuses 2A to 2D depending on print requests of the terminal apparatuses 2A to 2D.

The print program executing means 103 executes a print program 112 which will be described below. Contents of an execution will be described below.

The print data generating means 104 generates print data for a corresponding printing apparatus by using a printing apparatus driver 115 based on a print instruction given from the application 111.

The print data transmitting means 105 transmits the print data generated by the print data generating means 104 to the corresponding printing apparatus. A method of transmitting the print data will be described below.

The storing portion 11 has the server OS 110 for operating the control portion 10 as each of the means, the application 111 such as a word processor or a spreadsheet software which is to be operated over the server OS 110, the print program 112 for executing a printing operation in the printing apparatuses 30A to 32A, 30B to 32B, 30C and 30D in response to a request given from the application 111, a pseudo printing apparatus driver 113 which is handled as the printing apparatus driver over the server OS 110 and is thus operated, and serves to communicate with a pseudo application 212A which will be described below, the environmental research program 114 to be operated over the terminal apparatuses 2A to 2D, and the printing apparatus driver 115 for the printing apparatus 30C or 30D.

(Structure of Terminal Apparatus)

Figure 3:
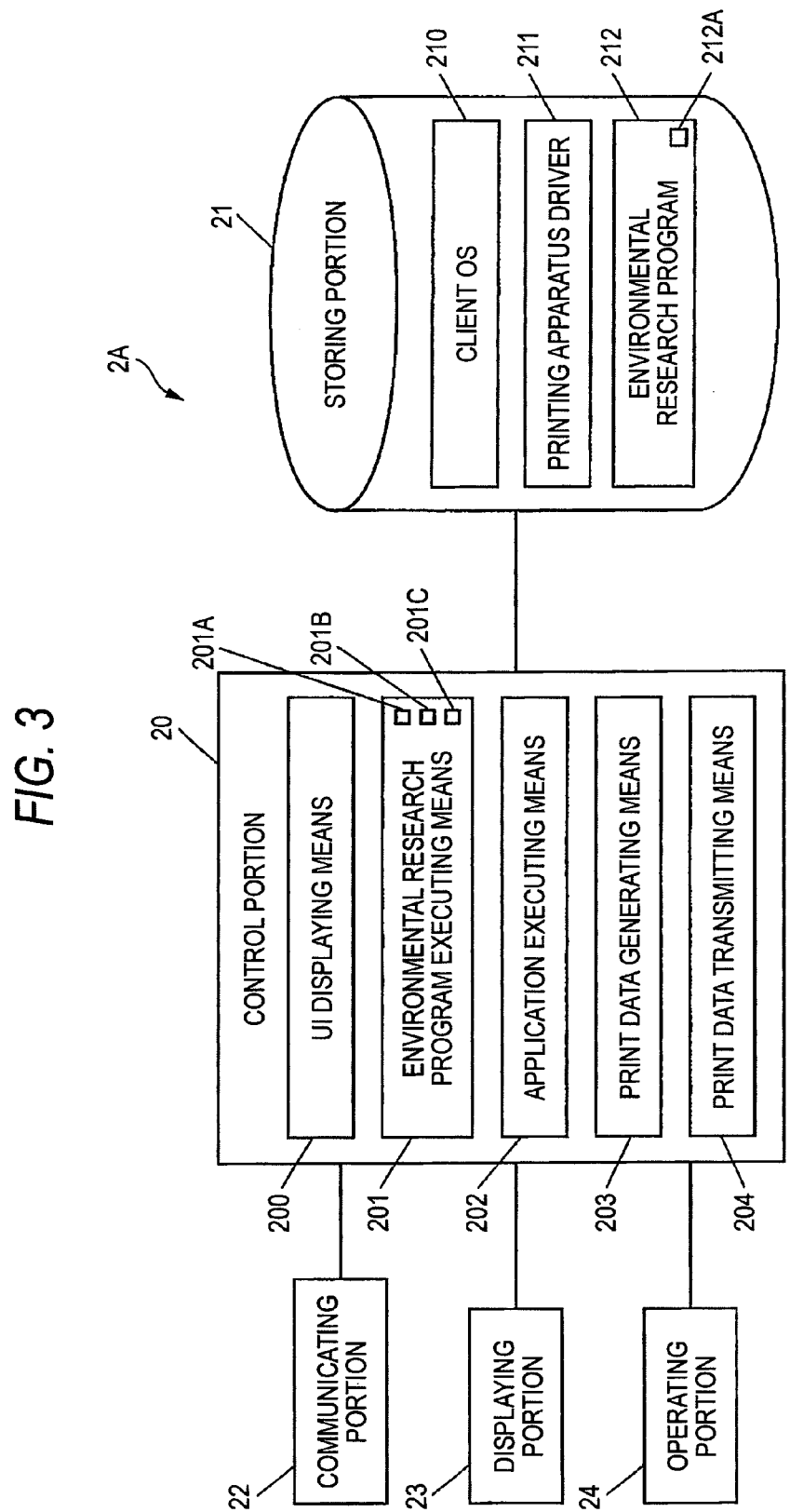
FIG. 3 is a schematic diagram showing an example of a structure of a terminal apparatus.

FIG. 3 is a schematic diagram showing an example of a structure of the terminal apparatus 2A. It is assumed that the terminal apparatuses 2B to 2D have the same structure as that of the terminal apparatus 2A, and description will be omitted.

The terminal apparatus 2A has a control portion 20 constituted by a CPU and serving to control each portion of the terminal apparatus 2A and to execute various programs, a storing portion 21 constituted by a storing device such as an HDD (Hard Disk Drive) or a flash memory and serving to store various information, a communicating portion 22 for communicating with an outside through the Internet 6, a displaying portion 23 such as a liquid crystal display, and the operating portion 24 such as a keyboard or a mouse.

The control portion 20 executes a client OS 210, thereby functioning as UI displaying means 200, environmental research program executing means 201, application executing means 202, print data generating means 203 and print data transmitting means 204.

The UI displaying means 200 displays the UI generated by the UI generating means 100 in the server apparatus 1.

The environmental research program executing means 201 executes an environmental research program 212 which will be described below, thereby functioning as model specifying means 201A, researching means 201B and method selecting means 201C.

The model specifying means 201A specifies the models of the printing apparatuses 30A to 32A connected to the terminal apparatus 2A through the LAN 5A. The researching means 201B researches whether the printing apparatus drivers corresponding to the models of the printing apparatus 30A to 32A specified by the model specifying means 201A are present in the terminal apparatus 2A and the server apparatus 1 or not. The method selecting means 201C selects a method of generating a print job through any of the printing apparatus drivers present in the terminal apparatus 2A or the server apparatus 1 based on a print instruction output from the application executing means 101 of the server apparatus 1.

The application executing means 202 executes the pseudo application 212A to be operated. The pseudo application 212A is treated in the same manner as a normal application to be operated over the client OS 210 and communicates with the pseudo printing apparatus driver 113 of the server apparatus 1. The pseudo application 212A and the pseudo printing apparatus driver 113 act as a proxy server respectively, and may freely carry out a two-way communication for information.

The print data generating means 203 generates print data for the printing apparatuses 30A to 32A by using a printing apparatus driver 211 based on a print instruction given from the pseudo application 212A.

The print data transmitting means 204 transmits the print data generated by the print data generating means 203 to the printing apparatuses 30A to 32A.

The storing portion 21 stores the client OS 210 for operating the control portion 20 as each of the means, the printing apparatus driver 211 which is prepared for each of the printing apparatuses and is used for generating print data, and the environmental research program 212 which is received from the server apparatus 1 and is thus installed.

The environmental research program 212 has the pseudo application 212A which is operated over the client OS 210 and communicates with the pseudo printing apparatus driver 113. The environmental research program 212 and the pseudo application 212A may be individually constituted, respectively.

The environmental research program 212 is downloaded from the server apparatus 1 and is thus executed when a communication between the server apparatus 1 and the terminal apparatus 2A is established. Moreover, the environmental research program 212 may be of such a type as to be previously installed by a user of the terminal apparatus 2A.

(Software and Communication Path Structure of Printing System)

Figure 4:
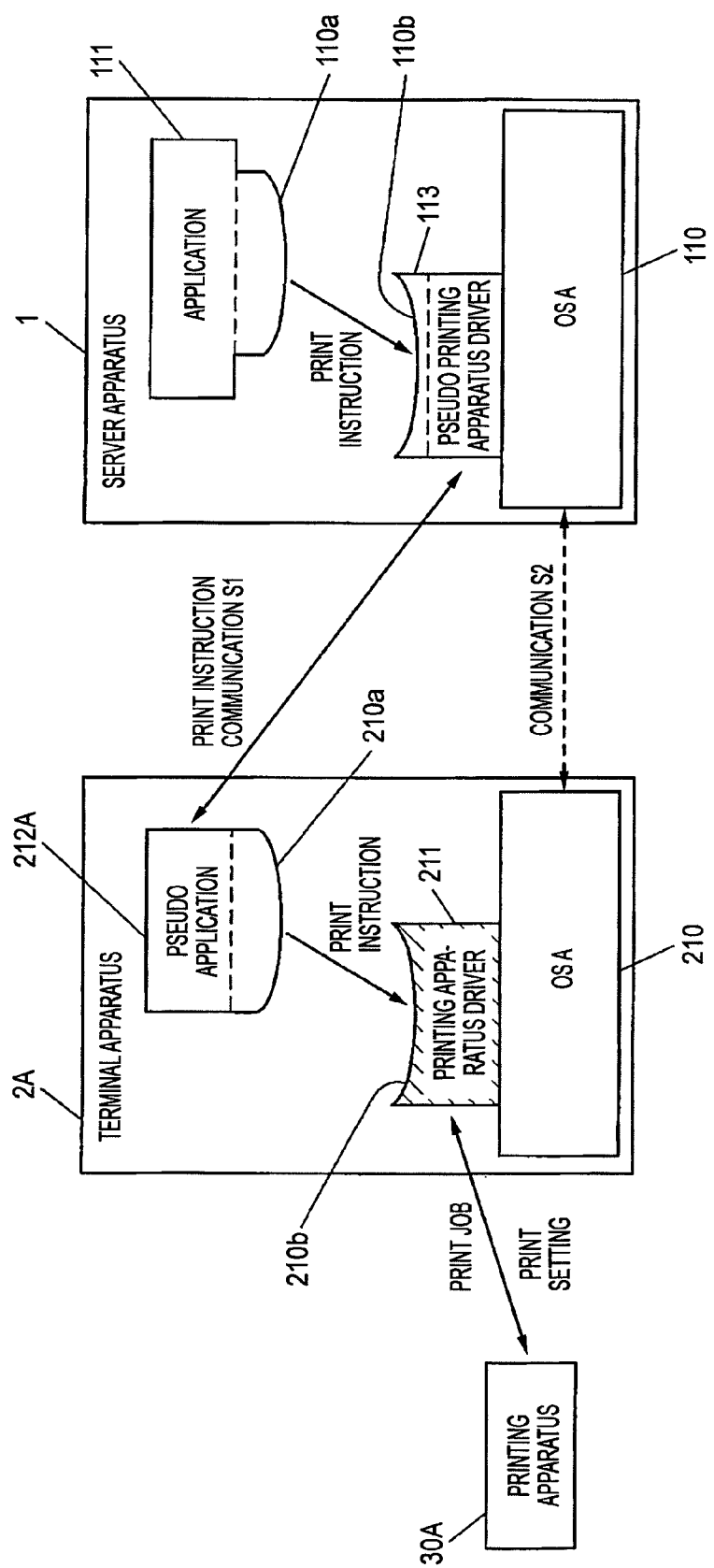
FIG. 4 is a schematic diagram showing an example of a communication between the server apparatus and the terminal apparatus.

FIG. 4 is a schematic diagram showing an example of a communication between the server apparatus 1 and the terminal apparatus 2A. It is assumed that the terminal apparatus 2B has the same structure as that of the terminal apparatus 2A, and description will be omitted.

In an example shown in FIG. 4, there is employed a software and communication path structure of the printing system 7 in the case in which the terminal apparatus 2A has the printing apparatus driver 211 corresponding to the printing apparatus 30A, and the structure will be hereinafter referred to as a "method 1". The server OS 110 and the client OS 210 act as an identical "OS A", and an interface depending on an OS for each communication is offered through the "OS A" to the application and the printing apparatus driver. For this reason, an identical format is used in interfaces 110a and 110b for carrying out a communication between the application 111 and the pseudo printing apparatus driver 113 and interfaces 210a and 210b for carrying out a communication between the pseudo application 212A and the printing apparatus driver 211 (this is drawn in an identical curve for simplicity of description in FIG. 4).

With the structure, since the pseudo printing apparatus driver 113 and the pseudo application 212A are constituted by the identical interfaces 110b and 210a, a direct communication may be carried out through a communication S1.

In other words, with the structure shown in FIG. 4, each instruction given from the application 111 is received by the pseudo printing apparatus driver 113, and the instruction received by the pseudo printing apparatus driver 113 is received by the pseudo application 212A through the direct communication S1 and is transmitted from the pseudo application 212A to the printing apparatus driver 211. The other communication is carried out through a communication S2. Detailed description will be given later.

Figure 5:
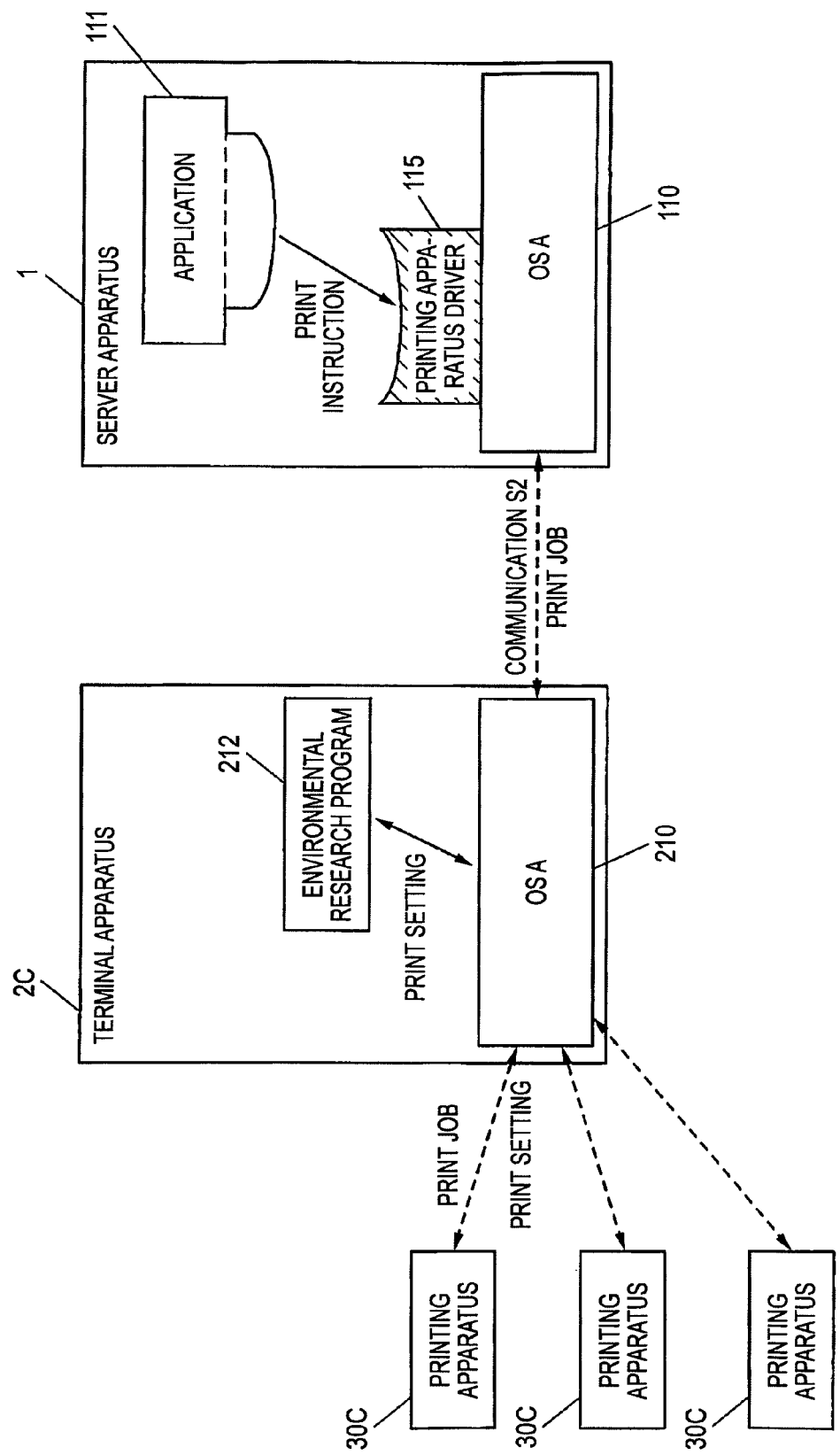
FIG. 5 is a schematic diagram showing another example of the communication between the server apparatus and the terminal apparatus.

FIG. 5 is a schematic diagram showing an example of a communication between the server apparatus 1 and the terminal apparatus 2C. It is assumed that the terminal apparatus 2D has the same structure as that of the terminal apparatus 2C, and description will be omitted.

In an example shown in FIG. 5, there is employed a software and communication path structure of the printing system 7 in the case in which the server apparatus 1 has the printing apparatus driver 115 corresponding to the printing apparatus 30C, and the structure will be hereinafter referred to as a "method 2". The server apparatus 1 has the printing apparatus driver 115 for generating a print job for the printing apparatus 30C upon receipt of a print instruction given from the application 111. A communication between the server apparatus 1 and the terminal apparatus 2C is executed through the communication S2, and the print job is transmitted from the server apparatus 1 to the terminal apparatus 2C.

The terminal apparatus 2C has the environmental research program 212 which serves to acquire print setting for the printing apparatus 30C and to transmit the print setting to the server apparatus 1, and furthermore, to transmit, to the printing apparatus 30C, the print job received from the server apparatus 1.

Although the server OS 110 and the client OS 210 act as the identical "OS A", they may be different from each other.

(Operation of Printing System)

With reference to each of the drawings, description will be given to an operation of the printing system according to the exemplary embodiment of the invention which is divided into (1) an operation before printing, (2) a preparation for a printing operation, (3) a printing operation using the method 1, and (4) a printing operation using the method 2. An operation to be carried out by the terminal apparatus 2A will be described below on behalf of the terminal apparatuses 2A to 2D.

(1) Operation Before Printing

First of all, the operating portion 24 is subjected to an input operation by a user so that the terminal apparatus 2A transmits a request for executing the application 111 in the server apparatus 1. The application executing means 101 of the server apparatus 1 accepts the executing request given from the terminal apparatus 2A and then executes the application 111, and the UI generating means 100 transmits, as a processing result, an image of a UI to be displayed on the displaying portion 23 of the terminal apparatus 2A.

Next, the user carries out the input operation over the operating portion 24 of the terminal apparatus 2A, thereby creating document data of a word processer in the application 111. When there is input an operation for giving a request for executing a printing operation in any of the printing apparatuses 30A to 32A with contents of the document data created by the user, moreover, the server apparatus 1 accepts the request for the printing work and is operated to execute the printing work in any of the printing apparatuses 30A to 32A.

(2) Preparation for Printing Operation

Description will be given to operations of the server apparatus 1, the terminal apparatus 2A and the printing apparatuses 30A to 32A in an execution of a printing operation.

Figure 6:
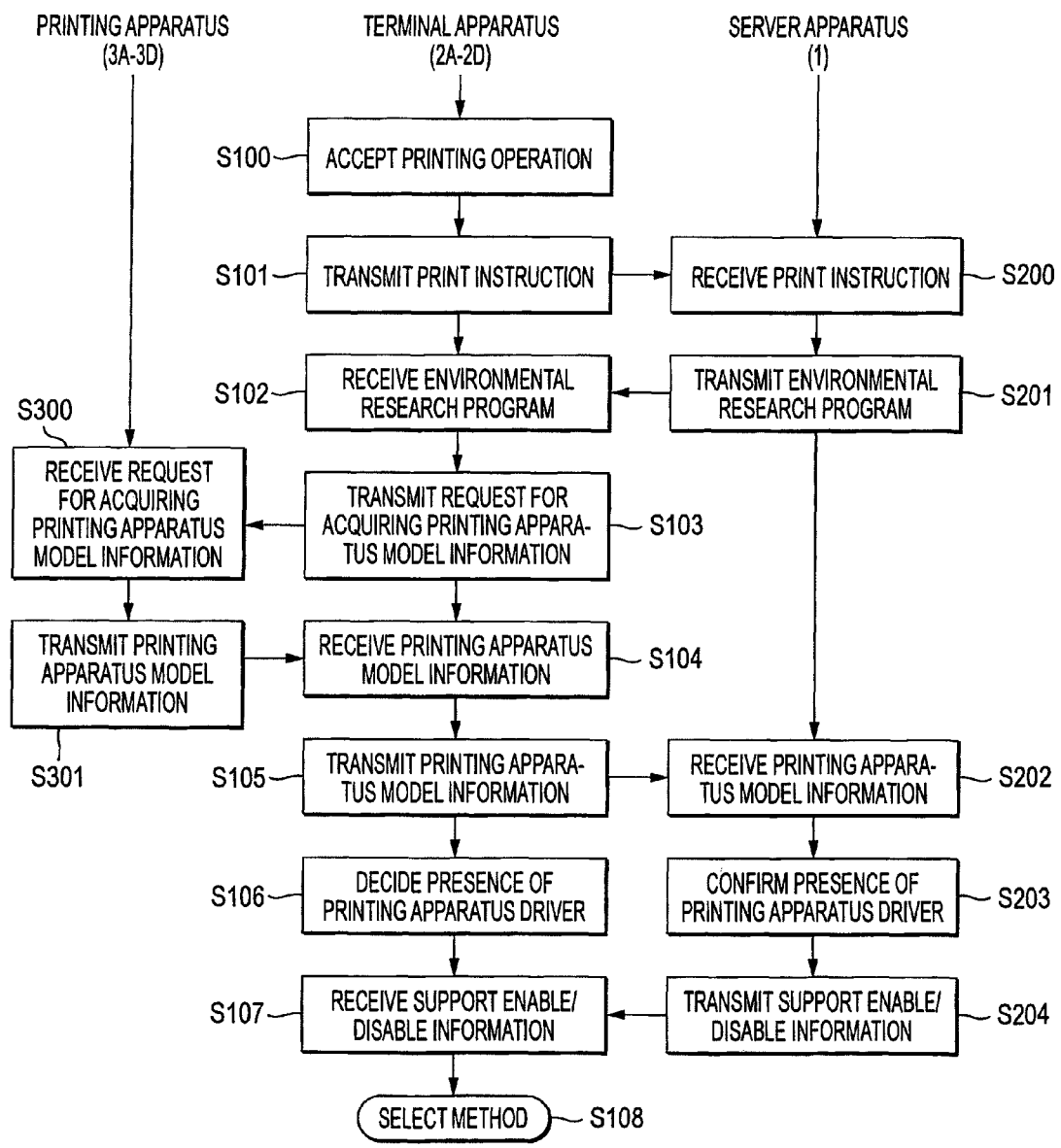
FIG. 6 is a flowchart showing an example of an operation of the printing system.

FIG. 6 is a flowchart showing an example of an operation of the printing system 7. The communication between the server apparatus 1 and the terminal apparatus 2A is carried out through the communication S2 shown in FIG. 4 if there is no particular notice.

First of all, when the terminal apparatus 2A accepts a printing operation through an operation input of a user (S100), it transmits a request for a print instruction to the server apparatus 1 (S101).

When the environmental research program transmitting means 102 of the server apparatus 1 receives the print instruction from the terminal apparatus 2A (S200), next, it transmits the environmental research program 114 to the terminal apparatus 2A (S201).

Then, the terminal apparatus 2A receives the environmental research program 114 (S102) and installs the environmental research program 114 in the storing portion 21. Thereafter, the environmental research program executing means 201 of the terminal apparatus 2A executes the environmental research program 212 and gives a request for acquiring information for specifying a model of a printing apparatus to the printing apparatuses 30A to 32A connected through the LAN 5A (S103).

Upon receipt of the request for acquiring the information for specifying the model of the printing apparatus from the terminal apparatus 2A (S300), subsequently, the printing apparatuses 30A to 32A transmit information about the model of the printing apparatus to the terminal apparatus 2A (S301).

Next, the environmental research program executing means 201 of the terminal apparatus 2A receives the information about the model of the printing apparatus (S104) and transmits the information about the model of the printing apparatus to the server apparatus 1 (S105). Moreover, the terminal apparatus 2A decides whether or not a printing apparatus driver which is coincident with the information about the model of the printing apparatus thus received at the Step S104 is present in the storing portion 21 (S106).

Then, the print program executing means 103 of the server apparatus 1 receives the information about the model of the printing apparatus from the terminal apparatus 2A (S202) and decides whether or not a printing apparatus driver which is coincident with the information about the model of the printing apparatus thus received is present in the storing portion 11 (S203). A purport that a support is enabled/disabled is transmitted as support enable/disable information to the terminal apparatus 2A if the driver is present/not present respectively at the Step S203 (S204).

Thereafter, the environmental research program executing means 201 of the terminal apparatus 2A receives the support enable/disable information from the server apparatus 1 (S107) and operates a method selecting program 212B of the environmental research program 212 to select whether a printing operation is executed by the method 1 or the method 2 based on the contents decided at the Step S106 and the support enable/disable information (S108).

Referring to the selection of the method at the Step S108, in principle, the method 1 shown in FIG. 4 is selected if the printing apparatus driver is present in the terminal apparatus 2A, and the method 2 shown in FIG. 5 is selected if the printing apparatus driver is present in the server apparatus 1. If the printing apparatus driver is not present, moreover, the printing operation is stopped.

Even if the printing apparatus driver is present in either the server apparatus 1 or the terminal apparatus 2A, the printing operation may be stopped or a user operating the terminal apparatus 2A may be caused to select whether the execution is carried out or not when a coincidence with a predetermined condition is not obtained.

If the printing apparatus driver is present in both the server apparatus 1 and the terminal apparatus 2A, furthermore, it is also possible to make a determination on the predetermined condition or to cause the user operating the terminal apparatus 2A to make a selection, or to compare versions of the printing apparatus drivers, thereby selecting a new or old one of them.

Referring to the method 1, that is, the case in which the terminal apparatus 2 has the printing apparatus driver, a printing operation will be described below.

(3) Printing Operation using Method 1

Figure 7:
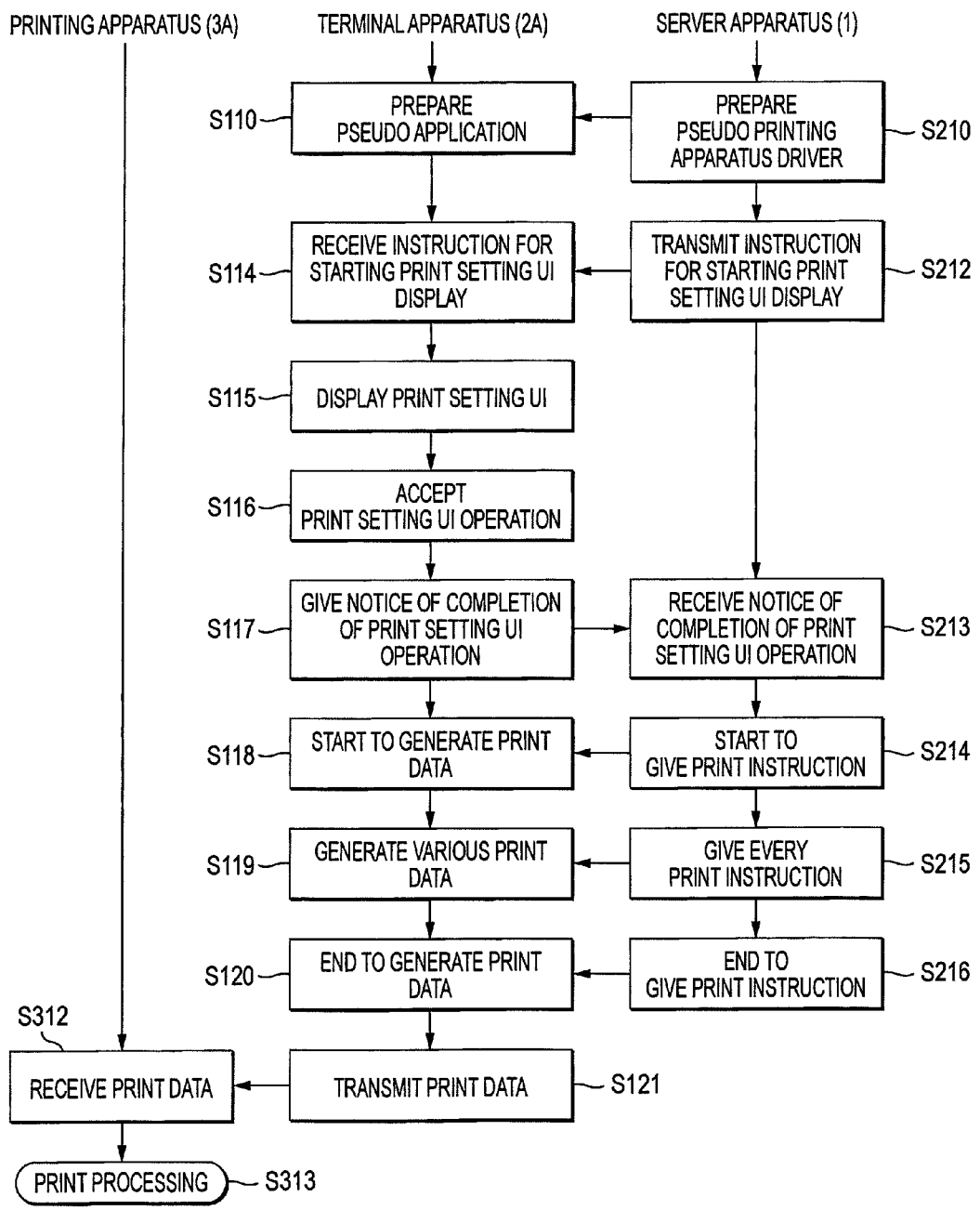
FIG. 7 is a flowchart showing an example of the operation of the printing system.

FIG. 7 is a flowchart showing an example of the operation of the printing system.

First of all, when the method 1 is selected, the print program executing means 103 of the server apparatus 1 prepares the pseudo printing apparatus driver 113 in order to communicate with the terminal apparatus 2A (S210).

Next, the environmental research program executing means 201 of the terminal apparatus 2A prepares the pseudo application 212A at the same time that the pseudo printing apparatus driver 113 is prepared in the server apparatus 1.

The structure shown in FIG. 4 is implemented by the preparation of the pseudo application 212A in the terminal apparatus 2A.

Then, the application executing means 202 executes the pseudo application 212A to start a communication with the pseudo printing apparatus driver 113 on the server apparatus 1 side. The application executing means 101 on the server apparatus 1 side transmits an instruction to the terminal apparatus 2A through the communication S1 in order to start to display a UI for a print setting operation (S212).

Thereafter, the application executing means 202 of the terminal apparatus 2A receives the instruction for displaying the UI for the print setting operation (S114) and displays, on a display screen, an image of the UI for the print setting operation (S115). The application executing means 202 accepts contents of an operation which are input for the display by a user, for example, paper setting, N-up setting or duplex/broadside print setting (S116), and gives the server apparatus 1 a notice that the operation is completed in the print setting UI through the communication S1 when the print setting is perfectly ended (S117).

The print program executing means 103 of the server apparatus 1 receives the purport that the operation is completed in the print setting UI (S213), and a print instruction is started by using document data created by the application executing means 202 (S214). At this time, the print instruction is transmitted from the application executing means 202 for executing the application 111 to the print data generating means 203 for executing the printing apparatus driver 211 through the print program executing means 103 for executing the pseudo printing apparatus driver 113, the communication S1, and the application executing means 202 for executing the pseudo application 212A.

The print data generating means 203 for executing the printing apparatus driver 211 starts to generate print data (S118) in response to the print instruction (S214) and generates various print data (S119) based on the various print instruction of the application executing means 101(S215).

When the application executing means 101 ends to give the print instruction (S216), the print data generating means 203 completes to generate the print data (S120) and the print data transmitting means 204 for executing the printing apparatus driver 211 transmits the generated print data to the printing apparatus 30A (S121).

Next, the printing apparatus 30A receives the print data (S312) and executes a print processing based on the print data (S313).

Referring to the method 2, that is, the case in which the server apparatus 1 has the printing apparatus driver, description will be given to a printing operation which is intended for the terminal apparatus 2D, for example.

(4) Printing Operation using Method 2

Figure 8:
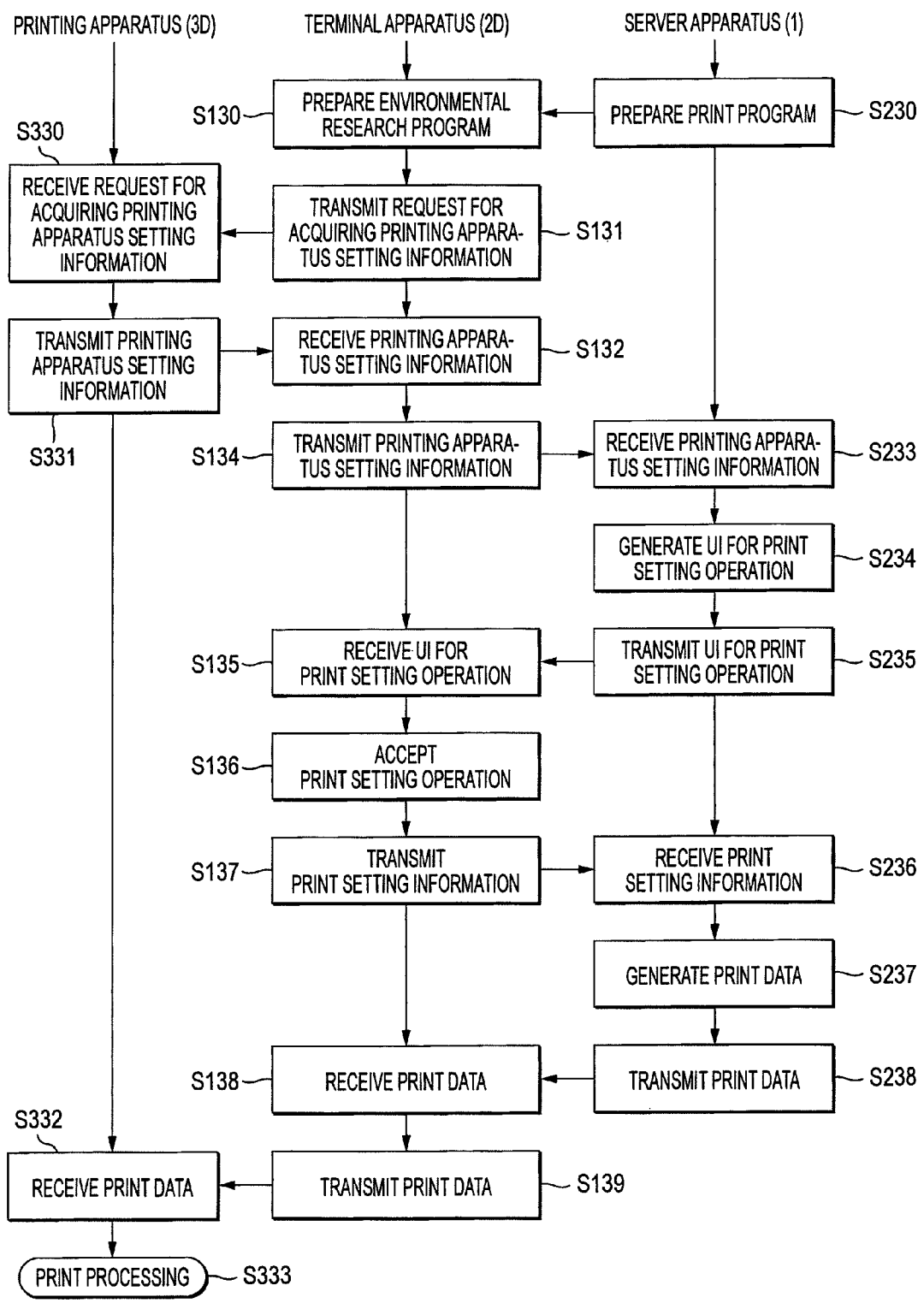
FIG. 8 is a flowchart showing another example of the operation of the printing system.

FIG. 8 is a flowchart showing another example of the operation of the printing system.

First of all, when the method 2 is selected, the print program executing means 103 of the server apparatus 1 prepares the print program 112 for the method 2 (S230). Consequently, the structure shown in FIG. 5 is implemented.

Next, the environmental research program executing means 201 of the terminal apparatus 2D transmits a request for acquiring printing apparatus setting information to the printing apparatus 30D (S131).

Then, the printing apparatus 30D receives the request for acquiring the printing apparatus setting information (S330) and transmits the printing apparatus setting information to the terminal apparatus 2D (S331).

Thereafter, the print program executing means 103 of the terminal apparatus 2D receives the printing apparatus setting information (S132). A printing apparatus driver to be prepared on the server apparatus 1 side is determined based on the printing apparatus model information received at the Step S104 shown in FIG. 6.

Subsequently, the environmental research program executing means 201 of the terminal apparatus 2D transmits the printing apparatus setting information to the server apparatus 1 (S134). Next, the UI generating means 100 of the server apparatus 1 receives the printing apparatus setting information (S233) and generates an image of a UI for operating the print setting by a user and information for an operation based on the printing apparatus setting information (S234), and transmits them as a UI for a print setting operation to the terminal apparatus 2D (S235).

Then, the terminal apparatus 2D receives the UI for the print setting operation (S135) and displays an image of the UI for the print setting operation on the display screen, and accepts contents of an operation which are input for the display to the operating portion 24 by the user, for example, the contents of the operation such as paper setting, N-up setting or duplex/broadside print setting (S136) and transmits them as the print setting information to the server apparatus 1 (S137).

The print data generating means 104 of the server apparatus 1 receives the print setting information (S236) and generates print data by using the print setting information, the printing apparatus driver 115 determined at Step S232, the application 111 and the document data created by the application 111 (S237). Thereafter, the print data transmitting means 105 transmits the generated print data to the environmental research program 212 (S238). At this time, the print data transmitting means 105 adds, to the print data, information for specifying a transmitting source of the print data into the printing apparatus 30D.

Subsequently, the environmental research program executing means 201 of the terminal apparatus 2D receives the print data from the server apparatus 1 (S138) and transmits the print data to the printing apparatus 30D to be the transmitting source (S139). Next, the printing apparatus 30D receives the print data (S332) and executes a print processing based on the print data (S333).

[Another Exemplary Embodiment]

The invention is not restricted to the exemplary embodiment but various changes may be made without departing from the scope of the invention. For example, the method selecting program may be constituted to be operated in the server apparatus 1. In that case, necessary information for the selection is transmitted from the terminal apparatus to the server apparatus 1 and a request for selecting the method in the server apparatus 1 is given.

For example, it is also possible to operate the application 111 in the terminal apparatus 2A and to execute a printing operation in the printing apparatus 30B connected to the terminal apparatus 2B.

Moreover, the UI generating means 100, the application executing means 101, the environmental research program transmitting means 102, the print program executing means 103, the print data generating means 104, the print data transmitting means 105, the UI displaying means 200, the environmental research program executing means 201, the application executing means 202, the print data generating means 203 and the print data transmitting means 204 which are used in the exemplary embodiment may be read from a storage medium such as a CD-ROM to the storing portion in the apparatus or may be downloaded into the storing portion in the apparatus from the server apparatus connected to a network such as an internet. Furthermore, a part or all of the means which are used in the exemplary embodiment may be implemented by a hardware such as an ASIC.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A printing system comprising:
   a terminal apparatus that is connected to a printing apparatus through a local area network; and
   a server apparatus that communicates with the terminal apparatus through an external communication network on an outside of the local area network and executes an application in response to an operating signal received from the terminal apparatus,
   wherein the terminal apparatus includes:
      a specifying unit that specifies a model of a printing apparatus connected to the terminal apparatus through the local area network by executing a printing environment determination program;
      a determination unit that determines whether a printing apparatus driver corresponding to the model specified by the specifying unit is present in either the terminal apparatus or the server apparatus; and
      a selecting unit that selects based on the result of the determination by the determination unit either:
         a first method of printing comprising:
            receiving a print instruction and print data from an application executed by the server apparatus,
            generating print information in accordance with the print instruction received in the printing apparatus driver of the terminal apparatus and transmitting the print information to the printing apparatus, or
         a second method of printing comprising:
            causing the printing apparatus driver in the server apparatus to generate print information in accordance with the print instruction of the application and transmitting the print information from the server apparatus to the printing apparatus.

2. The printing system according to claim 1, wherein the selecting unit of the terminal apparatus selects either the first method or the second method based on a given condition when the printing apparatus driver corresponding to the model of the printing apparatus is present in both the terminal apparatus and the server apparatus.

3. The printing system according to claim 1, wherein the terminal apparatus gives a request for selecting the first method or the second method in the server apparatus.

4. The printing system according to claim 1, wherein the server apparatus transmits, to the terminal apparatus, the printing environment determination; program in response to a request for a printing operation which is given from the terminal apparatus and installs the printing environment determination; program into the terminal apparatus.

5. A printing environment determination; method comprising:
   specifying a model of a printing apparatus connected to a terminal apparatus through a local area network;
   determining whether a printing apparatus driver corresponding to a model specified by the specifying step is present in either the terminal apparatus or a server apparatus connected to an external communication network on an outside of the local area network; and selecting either:

a first method for receiving a print instruction from an application executed by the server apparatus depending on the result of the determination of the determining step, generating print information in accordance with the print instruction received in the printing apparatus driver of the terminal apparatus and transmitting the print information to the printing apparatus, or a second method for causing the printing apparatus driver in the server apparatus to generate print information in accordance with the print instruction of the application and transmitting the print information from the server apparatus to the printing apparatus.

6. A non-transitory computer readable medium storing a program causing a computer to execute a process for printing environment determination of a printing system, the method comprising:

specifying a model of a printing apparatus connected to a terminal apparatus through a local area network;

determining whether a printing apparatus driver corresponding to a model specified by the specifying step is present in either the terminal apparatus or a server apparatus connected to an external communication network on an outside of the local area network; and selecting either:

a first method for receiving a print instruction from an application executed by the server apparatus depending on a result of the determination of the determining step, generating print information in accordance with the print instruction received in the printing apparatus driver of the terminal apparatus and transmitting the print information to the printing apparatus, or a second method for causing the printing apparatus driver in the server apparatus to generate print information in accordance with the print instruction of the application and transmitting the print information from the server apparatus to the printing apparatus.

* * * * *